Aug. 19, 1924.  
E. E. FOWLER  
1,505,250  
COMBINED TYPEWRITING AND COMPUTING MACHINE  
Filed April 27, 1923
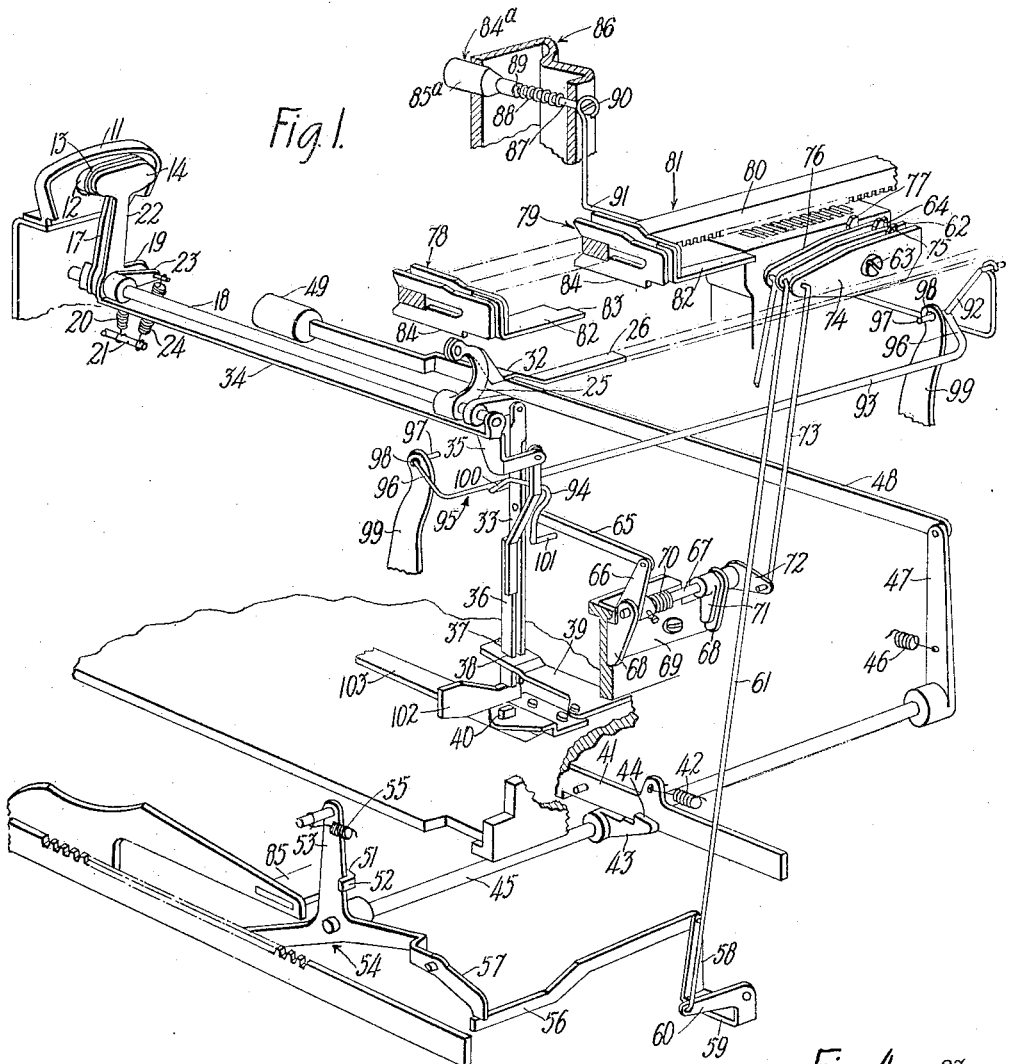
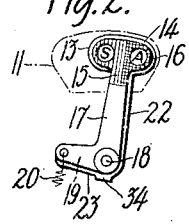
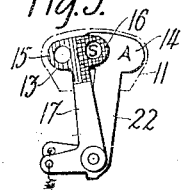
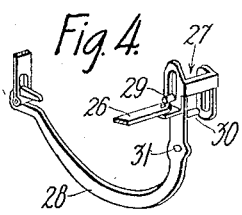
Inventor:  
Ewell E Fowler  
by B.C. Stickney  
Attorney Patented Aug. 19, 1924.

1,505,250

UNITED STATES PATENT OFFICE.

EWELL E. FOWLER, OF EAST POINT, GEORGIA, ASSIGNOR TO UNDERWOOD TYPEWRITER COMPANY, OF NEW YORK, N. Y., A CORPORATION OF DELAWARE.

COMBINED TYPEWRITING AND COMPUTING MACHINE.

Application filed April 27, 1923. Serial No. 634,966.

*To all whom it may concern:*

Be it known that I, EWELL E. FOWLER, a citizen of the United States, residing in East Point, in the county of Fulton and State of Georgia, have invented certain new and useful Improvements in Combined Typewriting and Computing Machines, of which the following is a specification.

This invention relates to combined typewriting and computing machines, and is illustrated as applied to an Underwood bookkeeping machine of the type disclosed in United States Patent to Adolph G. Kupetz, No. 1,356,072, dated October 19, 1920, and the co-pending application of said Adolph G. Kupetz, Serial No. 244,250, filed July 10, 1918 (now patent No. 1,452,162, dated April 17, 1923).

As disclosed in said co-pending application, each computation is initiated by typing an old balance, if any, in the proper column and running it additively into the machine. Debit and credit items are then typed in appropriate columns and run additively or subtractively into the machine. Preferably, the debits are typed in black and the credits in red, and the resulting balances, usually debit balances, are typed in black and subtracted to clear the register. The state of the computations and the color of typing for different columns or zones are controlled automatically by suitably shaped stops set on the carriage in positions corresponding to the computing zones. For convenience the stops for the subtraction zones may be referred to as red subtraction stops or black subtraction stops in accordance with the color of typing in the corresponding zone.

Sometimes the balance is a credit balance and must be run additively into the machine to clear the same. To distinguish from the debit balances, the credit balances are typed in red. This effect is obtained by means of a credit balance key, which, when depressed, acts through suitable means to reset the machine to cause the credit balance to be typed in red in the balance column and run additively into the machine.

For certain classes of work, it is desired to throw the machine into black subtraction in connection with a column for which a red subtraction stop is set on the carriage, and also to throw the machine into black subtraction in an addition column. The present invention relates to means for effecting such results.

As herein disclosed, two depending links are connected, respectively, to a state-signal and to both a color-signal and color-changing mechanism. Normally these links are in their lower positions when the machine is set for addition and are lifted in the operation of subtraction-setting, to cause the state-signal to indicate subtraction and the color-signal to indicate typing in red. When the black subtraction stop enters a computing zone, the color-controlling link is swung to ineffective position automatically.

According to the present invention, the color-controlling link may be shifted to ineffective position by means of a key or plunger, preferably mounted in the left-hand front post of the typewriter frame. Depression of this key causes a rearwardly-extending link to rock a bail and cause an arm on the bail to engage the color-controlling link and swing it to ineffective position.

Other features and advantages will hereinafter appear.

In the accompanying drawings,

Figure 1 is a skeleton perspective view showing the invention applied to so much of an Underwood bookkeeping machine of the credit-balance type as is necessary for the purpose of illustration.

Figure 2 is a view showing the setting of the color-signal and the state-signal for subtraction and typing in red.

Figure 3 is a view similar to Figure 2, but showing the signals set to indicate subtraction when typing in black.

Figure 4 is a fragmentary perspective view of the means to vary the throw of the ribbon-vibrator for determining the color of typing.

In the machine disclosed herein, provision is made of a shield 11 in the upper right-hand part of the machine and having a sight-opening 12 through which the color indications on a color signal 13 and the addition and subtraction indications on a state signal 14 may be viewed. As shown in Figures 2 and 3, the state signal 14 is provided with an "A" indicating addition and an "S" indicating subtraction, and the color signal 13 is provided with a red field 15 and a black field 16 corresponding to the red and black fields of a two-color ribbon to be used in the machine. Each of the color fields of the color signal 13 has a circular opening therein of sufficient size to permit either the "A" or the "S" on the state signal 14 to be viewed therethrough, the sight 12 and the shield 11 being of sufficient size to permit a portion of the color signal 13 around each of the openings to be seen through the sight 12.

The color signal 13 is mounted on the upper end of an upright arm 17 fixed on a shaft 18, said upright arm 17 having connected therewith an arm 19 extending substantially at right angles to the arm 17. A spring 20 is connected at one end to the outer end of the arm 19, and at the other to a pin 21 below the shaft 18 and mounted on a fixed part of the machine. In the same manner, the state signal 14 is supported on the upper end of an arm 22 pivotally mounted on the shaft 18 and having an arm 23 connected therewith and extending substantially at right angles thereto. The outer end of the arm 23 is connected by a spring 24 with the pin 21. It will be evident that the springs 20 and 24 tend to swing the color signal 13 and the state signal 14 to the left, looking at the front of the machine, so as to display the "A" of the state signal and the black portion of the color portion at the sight 12.

Fixed on the shaft 18 at a point considerably to the rear of the state and color signals is an arm 25, to the upper end of which is pivoted a link 26 connected at its other end with a slotted frame 27 by which the movement of a usual ribbon-vibrator lever 28 is controlled. The slotted frame 27 is mounted for transverse movement on the usual universal frame, not shown, which is operated each time a type-bar is swung to printing position. The connection between the slotted frame 27 and the ribbon-vibrator lever 28 is effected by means of pins 29 and 30, respectively, projecting from opposite sides of the ribbon-vibrator lever 28, and at different distances from a pivot 31 of the lever 28. As seen in Figure 4, the slotted frame is connected with the pin 29, which is located farther from the pivot 31 than is the pin 30, and consequently the ribbon-vibrator lever is given a shorter swing than would be the case if the pin 30 were engaged with the adjacent slotted portion of the frame 27. It will be evident that, if the color signal is swung to the right, as shown in Figure 2, the frame 27 will be shifted to the right, as seen from the front of the machine, to engage the pin 30 and to be disengaged from the pin 29. Mounted on the rear end of the shaft 18 is an arm 32 by which the shaft 18 may be turned against the action of the spring 20. Such action may be effected through a depending link 33 pivoted at its upper end to the outer end of the arm 32.

The arms 22 and 23 for controlling the color signal 13 form part of a bail 34 pivoted at its rear end on the shaft 18 adjacent the arm 32, and the bail is provided at its rear end with an arm 35 having pivoted thereto at its outer end the upper end of a link 36. At their lower ends the links 33 and 36 are guided in slots 37 and 38, respectively, said slots being formed in a bracket 39 attached to a fixed part of the frame of the machine. Immediately beneath the lower ends of links 33 and 36 is the upper end of a plunger 40, which is given an upward movement upon every rearward movement of a subtraction bar 41 under the influence of a spring 42. The plunger 40 corresponds to the plunger 95 shown in Figure 6 of said prior application, Serial No. 244,250, as operated by an arm extending rearwardly from a bell-crank 59 operable by a subtraction bar 56. Such upward movement of the plunger 40 will cause both of the links 33 and 36 to be lifted and the color signal and state signal to be shifted to the right, to the position shown in Figure 2. The subtraction bar 41 is normally held in its forward position by a hook 43 engaging in a notch 44 at the lower edge of the subtraction bar, said hook 43 being fixedly mounted on a shaft 45, which is normally urged to swing the hook 43 into effective position by means of a spring 46 connected at its rear end to an arm 47 fixed on the shaft 45. At its upper end the arm 47 is pivoted to the rear end of a link 48, having on its forward end the usual subtraction key 49, which extends through a suitable opening in the usual computer casing not shown. Upon depression of the subtraction key 49, the hook 43 will be withdrawn from the notch 44 and the subtraction bar released to be drawn rearwardly by its spring 42.

The rocking of the shaft 45 to release the subtraction bar 41 may also be effected automatically. To this end, provision is made at the right-hand end of the shaft 45 of an arm 51 fixed thereon and having at its upper end a lug 52 extending around the rear edge of an arm 53 of a three-arm lever 54 loosely mounted on the shaft 45 and normally urged to turn in a clockwise direction, as seen in Figure 1, by a spring 55. This turning movement of the three-arm lever 54 is normally prevented by means of a latch 56 extending under the rear end of a rearwardly-extending arm 57 of said three-arm lever 54. The latch 56 is pivoted at its other end to the upright arm 58 of a pivoted bail 59, provided at its other end with an arm 60, to which is pivoted the lower end of a link 61. The upper end of the link 61 is pivotally connected to a subtraction trip lever 62, pivotally mounted on a pivot screw 63 and provided with an upwardly-extending tappet 64 to be engaged by subtraction stops, to be described hereinafter. Upon depression of the tappet 64, the latch 56 will be withdrawn from the path of the arm 57, and the subtraction bar 41 will be released.

To permit the color-signal mechanism to be freed from the control of the plunger 40, the slot 37 in the bracket 39 is made of sufficient length to permit the link 33 to be shifted to one side of the plunger 40, where, as disclosed in said prior application, Serial No. 244,250, it may be actuated by other means. For shifting the link 33 out of the path of the plunger 40, provision is made of a link 65 pivoted at its forward end to the link 33 and at its rear end to an arm 66 fixed on a rock-shaft 67. The rock-shaft 67 is journaled in brackets 68 formed on a plate 69 secured to a fixed portion of the machine, and is normally urged to draw the link 65 rearwardly by means of a spring 70 connected at one end with the shaft 67 and at the other to a fixed part of the machine. The movement of the shaft 67 under the action of the spring 70 is limited by means of an arm 71 fixed on the shaft 67 and normally in engagement with the rear face of the plate 69. The shaft 67 may be actuated against the urging of the spring 70 by means of an arm 72 fixed on said shaft and having pivoted thereto at its rear end a link 73, which in turn is pivoted at its upper end to a lever 74, mounted on said pivot-screw 63 and provided with an upwardly-projecting tappet 75.

To operate the subtraction trip lever 62 and the lever 74 and also a motor-trip lever 76 provided with a tappet 77, provision may be made of suitable stops such as stops 78 and 79 shown in adjusted position on a rack 80 supported at the rear of and forming part of a carriage, denoted in general by 81.

Both of the stops 78 and 79 are subtraction stops; that is, they are so constructed as to engage and actuate the tappet 64 of the subtraction lever 62 as the carriage approaches the coresponding computing zone, and will thereby effect the setting of the computing mechanism for subtraction. When the machine is set for subtraction by means of an extension 82 of the stop 79, the plunger 40 will lift the link 33, and printing will be effected in red. When, however, the carriage enters a computing zone corresponding to the position of the stop 78, a projection 83 of the extension 82 of the stop 78 will engage the tappet 75 on the lever 74 and shift the link 33 rearwardly out of the path of the plunger 40, so that, when the subtraction lever 62 is operated by the extension 82 of the stop 78, the plunger 40 will pass to the rear of the link 33; the color-controlling mechanism being left in such condition that typing will be effected in black.

For convenience in referring to subtraction stops of the two forms shown, the stop 78 may be called a black subtraction stop and the stop 79 may be called a red subtraction stop. If desired, the subtraction stop 78 may be black in color and the subtraction stop 79 red. As the carriage travels out of the computing zone corresponding to either of the stops 78 and 79, a downward projection 84 on the effective stop will engage the tappet 77 on the motor-trip lever 76 and effect actuation of a general operator 85 in the usual manner. In connection with zones in which addition is to be effected, use is made of addition stops which differ from the subtraction stops in that the extension 82 and projection 83 are omitted. Such addition stops correspond to the addition stops shown in Figure 13 of said prior application, Serial No. 244,250.

In the preferred form of the invention use is made of a key or plunger $84^a$, which may be the usual margin-release key, having a head $85^a$ slidably mounted in the front web of the left front post 86 of the typewriter frame and a shank 87 slidably mounted in the rear web of said front post 86. The key $84^a$ is yieldably urged in forward direction by means of a spring 88 encircling the shank 87 and interposed between the rear web of the post 86 and a shoulder 89 on the plunger, the forward movement of the plunger being limited by engagement with the rear face of the rear web of post 86 of a screw 90 attached to the rear end of the shank 87.

The head of the screw 90 is provided with a peripheral groove to receive the bent end of a link 91 properly shaped to avoid interference with the adjacent parts of the machine, and connected at its rear end with an arm 92 to rock a bail 93 and cause an arm 94 projecting rearwardly from the bail to swing the color-controlling link 33 forwardly out of the path of the plunger 40.

Preferably the bail 93 is formed of two wires soldered or brazed together. One wire 95 extends the whole length of the bail and is bent to form arms 96 for the bail, and also to form at the ends of said arms fingers or pivots 97 projecting into openings 98 in stationary brackets 99. The other wire 100 comprises the arm 92 and extends along the adjacent arm 96 of the bail and the greater part of the length of the bail and rearwardly to form the arm 94. The portion of the wire 100 forming the arm 94 extends rearwardly between the links 33 and 36, downwardly back of the link 33, and laterally at its end to form a finger 101 extending across the link 33 to insure engagement therewith.

When the link 33 is in its forward position, it may be lifted by a cam member 102 carried by a member 103. The cam member 102 corresponds to the cam 111 of said prior application, Serial No. 244,250, which is mounted on a bell-crank 110 swingable about a fulcrum 110a, the bell-crank 110 being connected with a stem 113 of a credit balance key 108. As shown in Figure 4 of said prior application, depression of the credit balance key 108 also serves to trip the motor and actuate the general operator 48.

Variations may be resorted to within the scope of the invention, and portions of the improvements may be used without others.

Having thus described my invention, I claim:

1. In a combined typewriting and computing machine, a keyboard, a traveling carriage to determine computing zones, computing means including state-setting mechanism, bichrome mechanism normally controllable exclusively by said state-setting mechanism, means on the carriage for controlling the state-setting mechanism for different computing zones and for releasing, for certain zones, the bichrome mechanism from the control of the state-setting mechanism, and means for manually releasing the bichrome mechanism from the control of the state-setting mechanism, including a key accessible to an operator at the keyboard, a transverse bail actuable by said key, and an arm on said bail to disconnect the bichrome mechanism from the state-setting mechanism.

2. In a combined typewriting and computing machine, computing mechanism normally set for addition, subtraction-setting mechanism therefor, bichrome mechanism, an interponent normally actuable by said subtraction-setting mechanism and constituting the sole means for controlling the bichrome mechanism, and means for shifting said interponent to a position to be ineffective for operation of said bichrome mechanism by said subtraction-setting mechanism, said shifting means including a key accessible to an operator at the keyboard, a rearwardly-extending link operable by said key, a bail operable by said link, and an arm on said link to engage said interponent to shift the same to ineffective position.

3. In a combined typewriting and computing machine, bichrome mechanism to determine the color of typing, a color-signal to indicate at an observation point the setting of the bichrome mechanism, a state-signal to be observed at said observation point, state-setting mechanism normally in exclusive control of said state-signal and said bichrome mechanism, an interponent through which said control of the bichrome mechanism is effective, automatic means for controlling the state-setting mechanism, automatic means for relieving said bichrome mechanism from control by said state-setting mechanism, and manually-operable means for displacing said interponent to ineffective position, including a rearwardly-operable plunger at the front of the machine, a rearwardly-extending link operable by said plunger, a transverse member rockable by said link, and an arm on said member to engage said interponent and shift it to ineffective position.

4. In a combined typewriting and computing machine, bichrome mechanism to determine the color of typing, a color-signal to indicate at an observation point the setting of the bichrome mechanism, a state-signal to be observed at said observation point, state-setting mechanism normally in exclusive control of said state-signal and said bichrome mechanism, an interponent through which said control of the bichrome mechanism is effective, automatic means for controlling the state-setting mechanism, automatic means for relieving said bichrome mechanism from control by said state-setting mechanism, and manually-operable means for displacing said interponent to ineffective position, including a rearwardly-operable plunger at the front of the machine, a rearwardly-extending link operable by said plunger, and a transverse bail rockable by said link and having means thereon to engage said interponent and shift it to ineffective position.

5. In a combined typewriting and computing machine, subtraction-setting mechanism, bichrome mechanism shiftable by said subtraction-setting mechanism, an interponent by which such shifting is effected, and means for shifting said interponent, including a device formed of two rigidly-attached wires, one wire in the form of a complete pivotally-mounted bail and the other constituting an operating arm at one of the pivots and extending along the greater part of the bail and then away therefrom to form an interponent-controlling arm.

EWELL E. FOWLER.

Witnesses:
H. L. BRIDGES,
H. W. TODDRITH.